United States Patent
Zhen et al.

(10) Patent No.: US 12,379,519 B2
(45) Date of Patent: Aug. 5, 2025

(54) RECEPTION COMPENSATION APPARATUS BASED ON AIRBORNE TRANSIENT ELECTROMAGNETIC METHOD

(71) Applicant: INSTITUTE OF GEOLOGY AND GEOPHYSICS, THE CHINESE ACADEMY OF SCIENCES, Beijing (CN)

(72) Inventors: Qihui Zhen, Beijing (CN); Qingyun Di, Beijing (CN)

(73) Assignee: INSTITUTE OF GEOLOGY AND GEOPHYSICS, THE CHINESE ACADEMY OF SCIENCES, Beijing (CN)

( * ) Notice: Subject to any disclaimer, the term of this patent is extended or adjusted under 35 U.S.C. 154(b) by 311 days.

(21) Appl. No.: 17/947,199

(22) Filed: Sep. 19, 2022

(65) Prior Publication Data

US 2023/0008656 A1    Jan. 12, 2023

(51) Int. Cl.
*G01V 3/10* (2006.01)
*G01V 3/16* (2006.01)
*G01V 3/165* (2006.01)

(52) U.S. Cl.
CPC ............ *G01V 3/107* (2013.01); *G01V 3/16* (2013.01); *G01V 3/165* (2013.01)

(58) Field of Classification Search
CPC ........ G01V 3/104; G01V 3/105; G01V 3/107; G01V 3/108; G01V 3/15; G01V 3/16; G01V 3/165; G01V 3/19; G01V 3/101; G01V 3/102; G01R 33/0017; G01R 33/0041; G01R 33/028; G01R 33/0283; G01D 5/20; G01D 5/2006; G01D 5/2013; G01D 5/202; G01D 5/2026; G01D 5/2033; G01D 5/204; G01D 5/2046; G01D 5/2053; G01D 5/206; G01D 5/2066; G01D 5/2073; G01D 5/208; G01D 5/2086; G01D 5/2093; G01D 5/22; G01D 5/2208; G01D 5/2216;
(Continued)

(56) References Cited

U.S. PATENT DOCUMENTS

2018/0267193 A1    9/2018  Dodds
2020/0400854 A1*  12/2020  Di ........................ G01V 3/107

FOREIGN PATENT DOCUMENTS

CN    102159962 A    8/2011
CN    106443125 A    2/2017
(Continued)

OTHER PUBLICATIONS

International Search Report issued in corresponding International application No. PCT/CN2019/092461, mailed Mar. 23, 2020.
(Continued)

*Primary Examiner* — David M Schindler

(57) ABSTRACT

A reception compensation apparatus based on airborne transient electromagnetic method is disclosed, and includes a receiver coil, a transmitter coil, at least one compensation coil, and at least one compensation magnetic core, where the transmitter coil is disposed around a periphery of the receiver coil. The at least one compensation magnetic core is disposed around an outer surface of the transmitter coil. The at least one compensation coil is disposed around an outer surface of the compensation magnetic core.

17 Claims, 7 Drawing Sheets

(58) Field of Classification Search
CPC .. G01D 5/2225; G01D 5/2233; G01D 5/2241; G01D 5/225; G01D 5/2258; G01D 5/2266; G01D 5/2275; G01D 5/2283
See application file for complete search history.

(56) References Cited

FOREIGN PATENT DOCUMENTS

| | | |
|---|---|---|
| CN | 108535667 A | 9/2018 |
| CN | 109471180 A | 3/2019 |

OTHER PUBLICATIONS

Written Opinion of the International Searching Authority for No. PCT/CN2019/092461, mailed Mar. 23, 2020 (5 pages).

\* cited by examiner

RECEPTION COMPENSATION APPARATUS BASED ON AIRBORNE TRANSIENT ELECTROMAGNETIC METHOD

TECHNICAL FIELD

This application relates to the field of metallic ore exploration technologies, and more particularly relates to a reception compensation apparatus based on airborne transient electromagnetic method.

BACKGROUND

The airborne transient electromagnetic method is a widely used method for exploring metallic ores in recent years. It has advantages such as a high speed, high efficiency, a large exploration depth, high resolution, and small impact from topography, and so is particularly suitable for shallow overburden regions where operations encounter great difficulty.

A positional relationship between a transmitter coil and a receiver coil in the existing airborne transient electromagnetic method is shown in FIG. 1. The transmitter coil and the receiver coil are located on the same horizontal plane, which are usually similar to two concentric circles in terms of shape. The transmitter coil has a radius of about 25 meters and three to six turns. The receiver coil has a radius of about 1 meter and more than 100 turns. The transmitter coil has relatively large inductance and a transmission current up to hundreds of amperes. When transmission is disabled, however, the transmission current cannot immediately fall to zero, but with a relatively long current falling time. In this process, a very large induction voltage without geological information is generated on the receiver coil, and so a signal of a secondary field that carries geological information is blocked and cannot be identified. To eliminate the strong interference caused by this primary field, existing solution at home and abroad uses a compensation coil which is usually placed at ⅓ of the radius of the transmitter coil, and furthermore their current directions are opposite, both coils are in the same loop, so that the induction signal is eliminated, which is generated by the primary field, as shown in FIG. 2. The transmission compensation coil usually has one turn. Magnetic fields produced by the transmitter coil and the transmission compensation coil close to the receiver coil have opposite directions; therefore, an induction signal of the primary field in which current falling occurs can be greatly suppressed on the receiver coil.

Disadvantages of the existing receiving compensation method are as follows: The transmission compensation coil can greatly suppress the induction signal of the primary field, but it is difficult to achieve theoretical suppression effects in actual implementation, because the position of the compensation coil impacts the compensation effects. The transmitter coil usually uses a polygon to approximate a circle, and it is difficult to adjust the compensation coil to an ideal position. Consequently, the receiving magnetic field is undercompensated or overcompensated, and a truly ideal measurement signal cannot be obtained. In addition, the transmission compensation coil weakens energy injected into the earth by the primary field, reduces strength of the secondary field, and weakens the exploration effect.

SUMMARY

This application provides a reception compensation apparatus based on airborne transient electromagnetic method, to resolve to some extent at least one of the foregoing technical problems in the related art.

To resolve the foregoing problem, this application provides the following technical solutions.

There is provided a reception compensation apparatus based on airborne transient electromagnetic method, the reception compensation apparatus including a receiver coil, a transmitter coil, at least one compensation coil, and at least one compensation magnetic core, where the transmitter coil is disposed around the periphery of the receiver coil, the at least one compensation magnetic core is disposed around an outer surface of transmitter coil, and each compensation coil is wound around an outer surface of the respective compensation magnetic core.

In some embodiments, the transmitter coil and the receiver coil are concentric circles.

In some embodiments, the at least one compensation magnetic core is a magnetic ring, and is sleeved around an outer surface of the transmitter coil.

In some embodiments, the at least one compensation magnetic core sleeves tightly around the outer surface of the transmitter coil.

In some embodiments, the at least one compensation magnetic core is separated from the transmitter coil by a gap.

In some embodiments, the compensation coil and the receiver coil implement a signal neutralization method in which the compensation coil and the receiver coil respectively process two signals and neutralize the two signals by using an addition/subtraction circuit.

In some embodiments, the reception compensation apparatus further includes a shielded twisted pair that is disposed between the transmitter coil and the at least one compensation coil and that connects the receiver coil to the at least one compensation coil.

In some embodiments, each compensation coil includes a plurality of windings that are evenly wound around the respective compensation magnetic core.

In some embodiments, the at least one compensation magnetic core comprises a plurality of compensation magnetic cores, and accordingly the at least one compensation coil includes a plurality of compensation coils that are connected to each other in series by a wire, wherein the plurality of compensation coils are wound in a same direction.

In some embodiments, the reception compensation apparatus further includes a shielded twisted pair disposed between the transmitter coil and the at least one compensation coil and that connects the receiver coil to the at least one compensation coil. The addition/subtraction circuit includes a first amplifier, a second amplifier, a third amplifier, a first resistor, a second resistor, a third resistor, and a capacitor. A signal picked up by the receiver coil is fed to a non-inverting terminal of the first amplifier, an inverting terminal of the first amplifier is directly connected to an output terminal of the first amplifier through a wire, and the output terminal of the first amplifier is connected to one end of the first resistor, and the other end of the first resistor is directly coupled to a final desired compensated signal. A signal picked up by the at least one compensation coil is fed to one terminal of the capacitor, the other terminal of the capacitor is connected to an inverting terminal of the second amplifier and to one end of the third resistor, a non-inverting terminal of the second amplifier is grounded, and the other end of the third resistor is connected to an output terminal of the second amplifier, which is further connected to a non-inverting terminal of the third amplifier. An inverting terminal of the third amplifier is directly connected to an output terminal of the third amplifier through a wire, and the output terminal of the third amplifier is connected to one end of the second resistor, and the other end of the second resistor is directly coupled to the final desired compensated signal.

Compared with the related art, the embodiments of this application have the following beneficial effects. According to the reception compensation apparatus for the airborne transient electromagnetic method in some embodiments of this application, compensation is made for the receiver coil, so that it is more flexible to debug the reception compensation apparatus and more convenient to assemble the reception compensation apparatus, and furthermore more thorough suppression is implemented. In addition, the provided receiving compensation coils weaken neither energy injected into the earth by the primary field nor a signal of a secondary field, and exert no impact on the exploration ability. In this way, complete compensation of the primary field can be implemented, and therefore a cleaner signal of the secondary field can be obtained, thereby greatly improving an exploration depth and resolution.

BRIEF DESCRIPTION OF DRAWINGS

FIG. 11 is a schematic diagram illustrating an example addition/subtraction circuit according to yet another embodiment of the present application, which includes a compensator coil, a receiver coil, and a shielded twisted pair connected in between.

DESCRIPTION OF EMBODIMENTS

For a better understanding of the objectives, technical solutions, and advantages of this application, this application will be described in further detail below with reference to the accompanying drawings and embodiments. It should be understood that the specific embodiments described herein are merely intended to explain this application, rather than limit this application.

Figure 1:
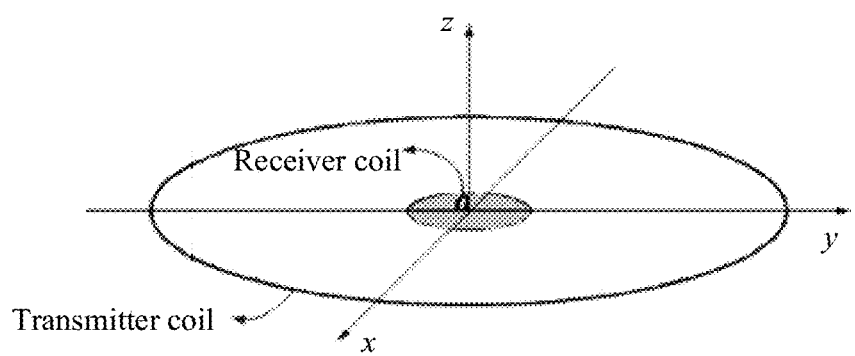
FIG. 1 is a diagram of a positional relationship between a transmitter coil and a receiver coil for an existing airborne transient electromagnetic method.
Figure 2:
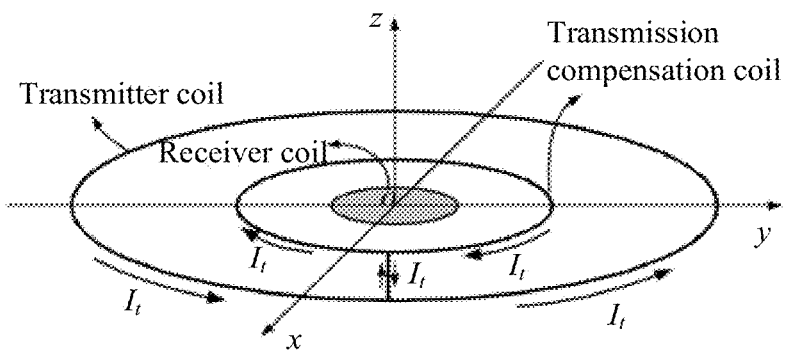
FIG. 2 is a schematic structural diagram of a transmission compensation coil for an existing airborne transient electromagnetic method.
Figure 3:
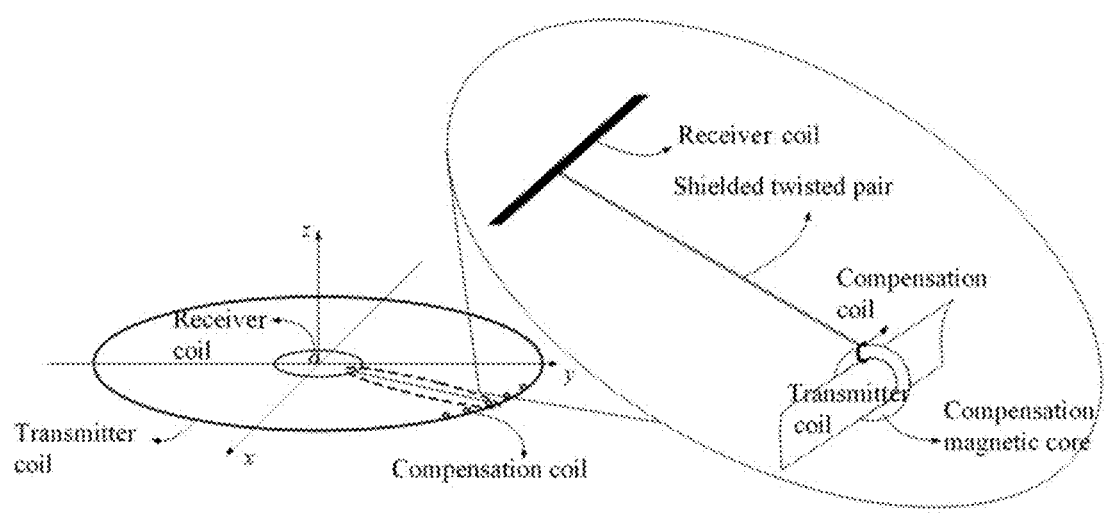
FIG. 3 is a schematic structural diagram of a reception compensation apparatus based on airborne transient electromagnetic method according to embodiments of this application.
Figure 4:
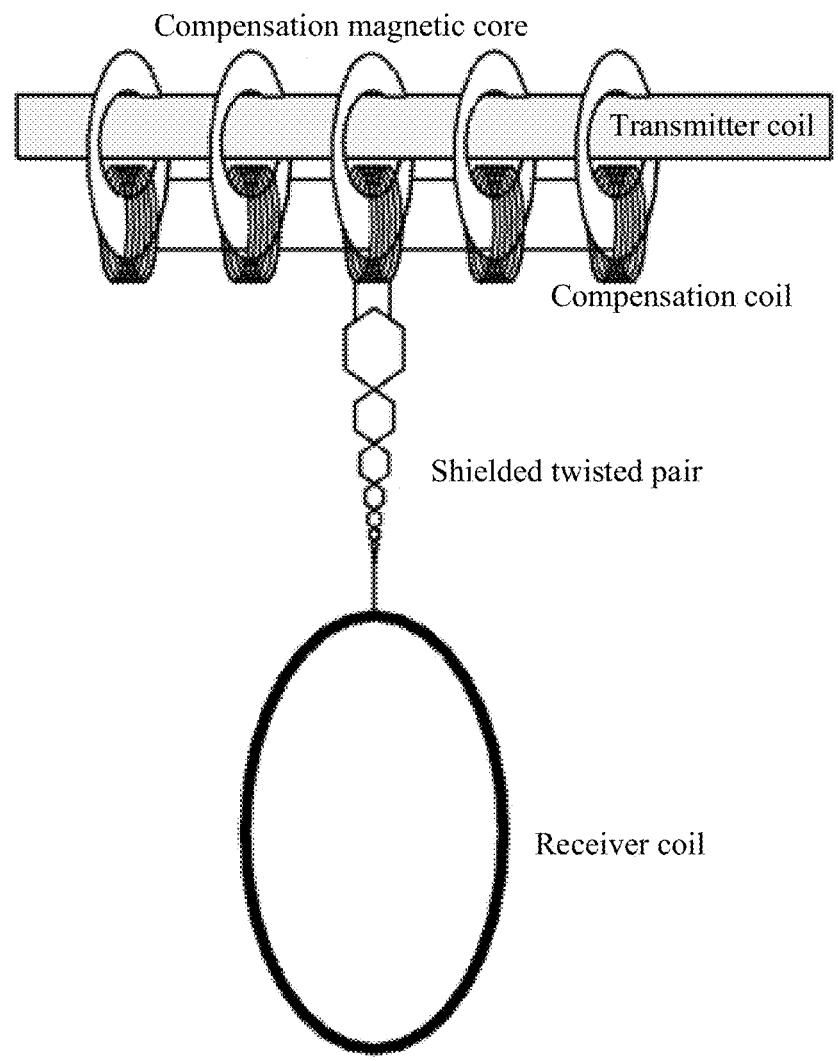
FIG. 4 is a schematic diagram of a connection relationship between a receiver coil and a compensation coil.

FIG. 3 is a schematic structural diagram of a reception compensation apparatus based on airborne transient electromagnetic method according to an embodiment of this application. The reception compensation apparatus includes a transmitter coil, a receiver coil, at least one compensation magnetic core, and at least one compensation coil. The at least one compensation magnetic core is a magnetic ring that is disposed beyond the receiver coil and around the periphery of the transmitter coil, and that is sleeved around the outer surface of the transmitter coil. A respective compensation coil may be wound around each compensation magnetic core, where each compensation coil may include one or more windings. In cases where there are multiple compensation coils, they may be spaced apart from each other at intervals. In cases where there are multiple compensation magnetic cores hence multiple compensation coils, all compensation coils are electrically connected to each other by wires, and the receiver coil is connected to one of the compensation coils by a shielded twisted pair. In particular, FIG. 4 shows a schematic diagram illustrating a connection relationship between the receiver coil and the corresponding compensation coil. In some embodiments, considering that only one compensation coil may not be able to obtain enough compensation strength, multiple compensation coils may be used which are connected in series in the same winding direction, hence the same signal polarity. In some other embodiments, the signal of a single compensation coil may be amplified for post-processing. The above alternatives may be selected depending on engineering needs.

In some embodiments of the present application, the transmitter coil and the receiver coil are concentric circles, or the transmitter coil and the receiver coil may not be concentric. Let the radius of the transmitter coil be R, a flowing current be I, and a Cartesian coordinate system is set up as illustrated in FIG. 3. Because of symmetry of the transmitter coil, only the magnetic field distribution in the YOZ plane needs to be calculated, where Y and Z are radial and axial components respectively. Take one point $P(0, y_0, z_0)$ in the plane YOZ. In this case, components of magnetic induction strength of the transmitter coil at the point P are as follows:

$$\begin{cases} B_x = \int dB_x = \frac{nR\mu_0 I_0}{4\pi} \int_0^{2\pi} \frac{\cos\theta \cdot z_0}{r^3} d\theta \\ B_y = \int dB_y = \frac{nR\mu_0 I_0}{4\pi} \int_0^{2\pi} \frac{\sin\theta \cdot z_0}{r^3} d\theta \\ B_z = \int dB_z = \frac{nR\mu_0 I_0}{4\pi} \int_0^{2\pi} \frac{(R - y_0\sin\theta)}{r^3} d\theta \end{cases} \quad (1)$$

where $$r = \sqrt{(R\cos\theta)^2 + (y_0 - R\sin\theta)^2 + z_0^2} \quad (2)$$

Figure 5:
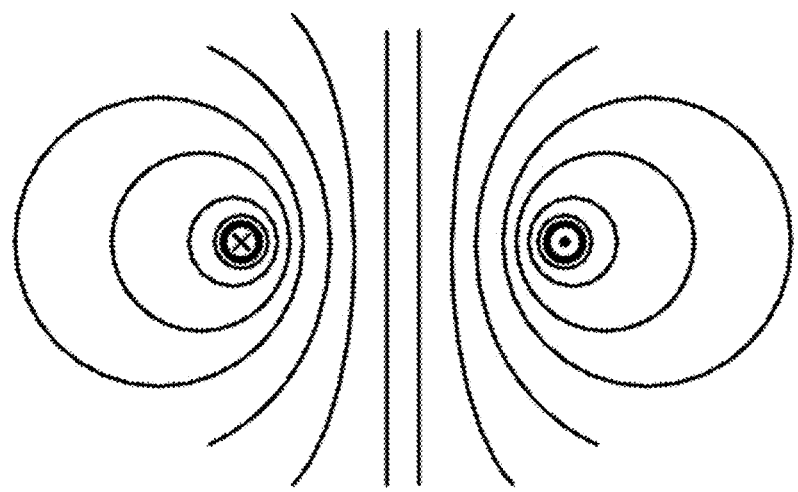
FIG. 5 shows distribution of magnetic induction strength around a transmitter coil.

According to formula (1), it is clear that $B_x=0$, $B_y\neq 0$, and $B_z\neq 0$. In other words, the magnetic induction strength of the transmitter coil has only radial and axial components, and magnetic field distribution features of the transmitter coil can be described by using a two-dimensional diagram. Specifically, FIG. 5 illustrates the distribution of the magnetic induction strength around the transmitter coil.

Figure 6:
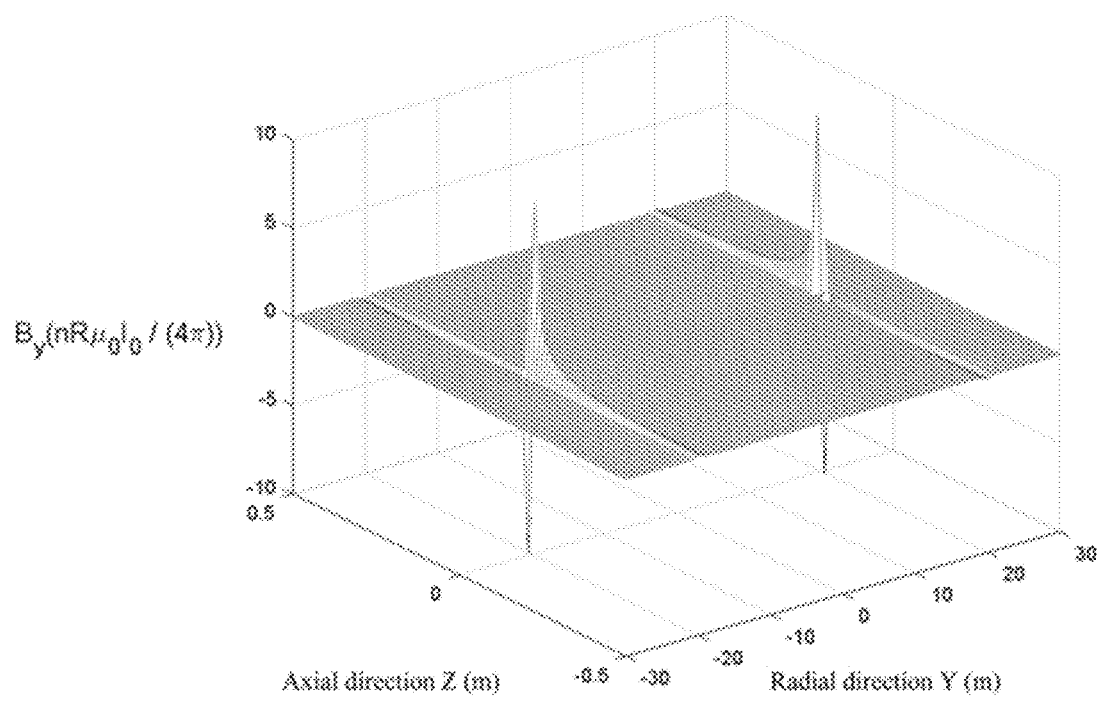
FIG. 6 and FIG. 7 are respectively schematic diagrams of distribution of magnetic induction strength in a radial direction $B_y$ and an axial direction $B_z$.
Figure 7:
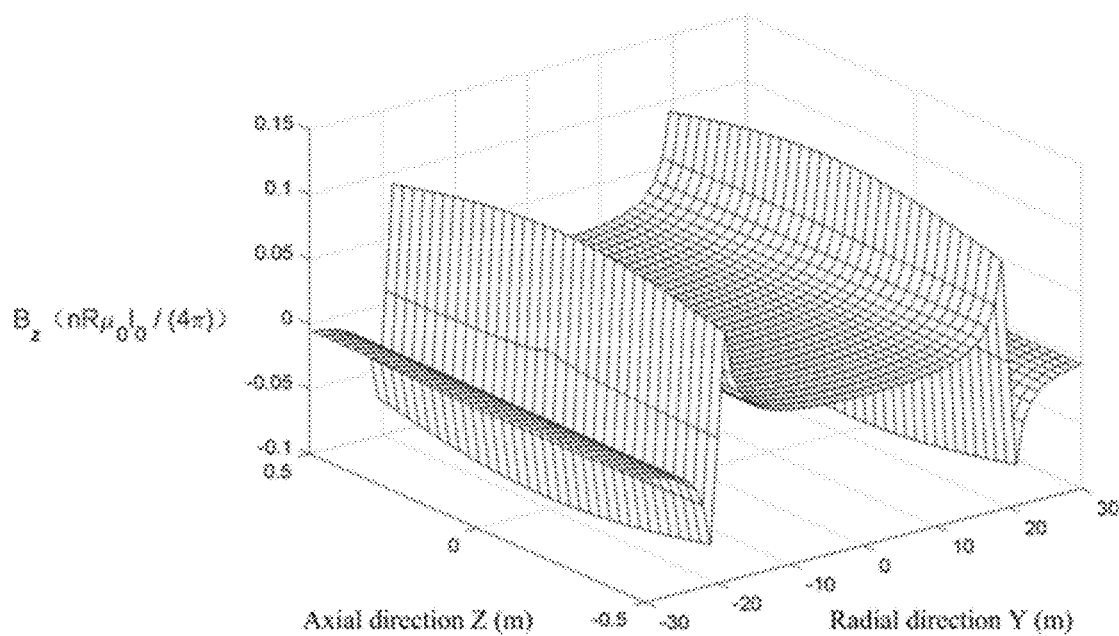

Let the radius of the coil be R=20 m, then the spatial distribution of the magnetic induction strength around the coil in the radial direction $B_y$ and the axial direction $B_z$ can be obtained by using a Matlab numerical integration method, as shown in FIG. 6 and FIG. 7. A position of the compensation coil is near a position where z=0 and R=±20 m. At this position, the component $B_y$ is the maximum, while the component $B_z$ is almost equal to 0.

A vertical component of an airborne electromagnetic secondary field is usually far greater than a horizontal component thereof, and the compensation coil should be placed on the edge of the transmitter coil. A cross-sectional area and a length of the compensation coil should be small enough, so that the compensation coil is not able to capture a signal of the secondary field, and a resonant frequency of the compensation coil should be far higher than a frequency of a transmission switch. The compensation coil is such designed that the transmitter coil produces the same flux linkage as the receiver coil. The flux linkage that passes through the receiver coil is first calculated, and then parameters of the compensation coil may be designed based on the flux linkage.

If the compensation coil is also a hollow coil, the requirement for a small enough cross-sectional area and length cannot be met. Therefore, according to the reception compensation apparatus base on the airborne transient electromagnetic method in some embodiments of this application, there is disposed at least one compensation magnetic core, and the respective compensation coil surrounds each compensation magnetic core. By virtue of this structure, the compensation coil can be designed to be very small, eliminating the need to consider the impact of the secondary field, ending up in only a signal of a primary field being picked up.

In some embodiments of this application, methods for disposing the compensation magnetic core include the following: The compensation magnetic core may sleeve tightly on the outer surface of the transmitter coil, or may be separated from the outer surface of the transmitter coil by a specific gap. Magnetic permeability of the compensation magnetic core should not be too high, for purposes of avoiding magnetic saturation. When the compensation coil is fully matched with the receiver coil, a signal of the receiver coil and a signal of the compensation coil are neutralized to accomplish compensation of the primary field. In some embodiments of this application, a signal neutralization method for the compensation coil and the receiver coil is described below.

Figure 8:
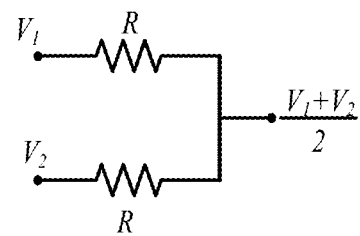
FIG. 8 is a schematic diagram illustrating an example addition/subtraction circuit according to an embodiment of the present application.

This method is separately process the two signals before finally neutralizing the two signals by using an addition/subtraction circuit. FIG. 8 is a schematic diagram illustrating an example addition/subtraction circuit according to an embodiment of the present disclosure. As illustrated in FIG. 8, the addition/subtraction circuit may have to inputs V1 and V2, which will cause the addition/subtraction circuit to give an output of (V1+V2)/2. This is, however, merely an example addition/subtraction circuit intended for the purpose of illustrating the operation of an addition/subtraction circuit, rather than indicating or implying that such an addition/subtraction circuit will be the one used in the present application.

Figure 9:
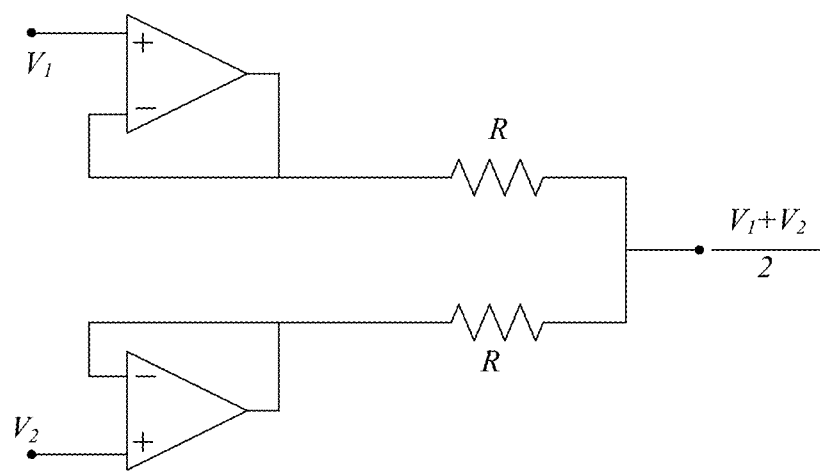
FIG. 9 is a schematic diagram illustrating an example addition/subtraction circuit according to another embodiment of the present application.

In some embodiments, based on the example addition/subtraction circuit illustrated above, this method, namely separately process the two signals before finally neutralizing the two signals by using an addition/subtraction circuit, requires that output impedance of the signal is sufficiently low, so a follower circuit with a small output impedance is usually added in front, as shown in FIG. 9.

Figure 10:
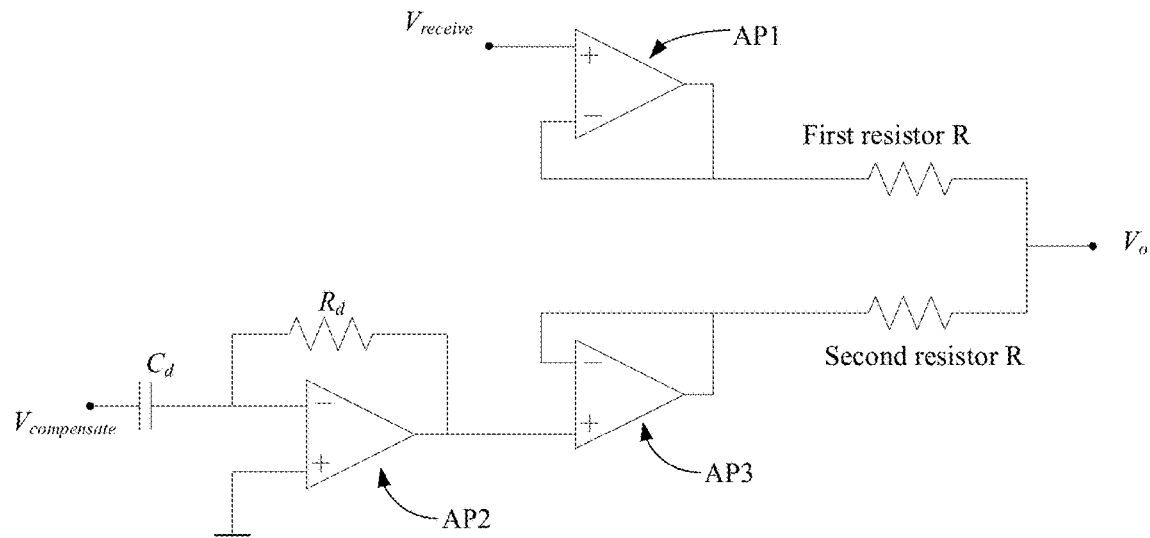
FIG. 10 is a schematic diagram illustrating an example addition/subtraction circuit according to yet another embodiment of the present application.

In some embodiments, further considering that the phase difference between the signal of the at least one compensation coil and the signal of the receiver coil is 90 degrees, the signal of the at least one compensation coil may need to undergo a differential circuit before entering the addition/subtraction circuit for addition/subtraction processing, as illustrated in FIG. 10. In particular, as shown in the drawing, $V_{compensate}$ may represent the signal of the at least one compensation coil, while $V_{receive}$ may represent the signal picked up by the receiver coil, and these two signals are used as two inputs of the illustrative addition/subtraction circuit.

For example, the signal $V_{receive}$, as one input, may be fed to the non-inverting terminal of the respective first amplifier AP1, while the other input, namely $V_{compensate}$, may be coupled to the inverting terminal of the respective second amplifier AP2, through a capacitor Cd. The inverting terminal of the first amplifier AP1 may be directly coupled to the output of the first amplifier AP1 through a wire, and the output of the first amplifier AP1 may further be connected through a first resistor R to the final output V0 of the addition/subtraction circuit. The non-inverting terminal of the second amplifier AP2 may be grounded, while the inverting terminal may be connected to its the output of the second amplifier AP2 through a resistor Rd. The output terminal of the second amplifier AP2 may then further be connected to the non-inverting terminal of a further third amplifier AP3. The inverting terminal of the third amplifier AP3 may be directly coupled to the output of the third amplifier AP3 through a wire, which may further be connected through a second resistor R to the final output V0 of the addition/subtraction circuit. It is noted that the second amplifier AP2 as illustrated in the drawing constitute a differential circuit.

In some embodiments, to reduce the parasitic inductance of the compensation loop and ensure that the compensation loop has a wide enough bandwidth and further reduce the signal interference, a shielded twisted pair needs to be connected between the receiver coil and the compensation coil, and the transmitter coil is connected to the compensation coil by using the shielded twisted pair. If the bandwidth of the compensation loop is not enough, then the signal of the compensation loop cannot keep up with the change speed of the primary field, rendering the compensation invalid. If the shielded twisted pair is replaced with a common wire, then this wire is equivalent to a 1-turn coil, and so the interference that needs to be compensated would be introduced into the loop again, rendering the compensation invalid.

Figure 11:
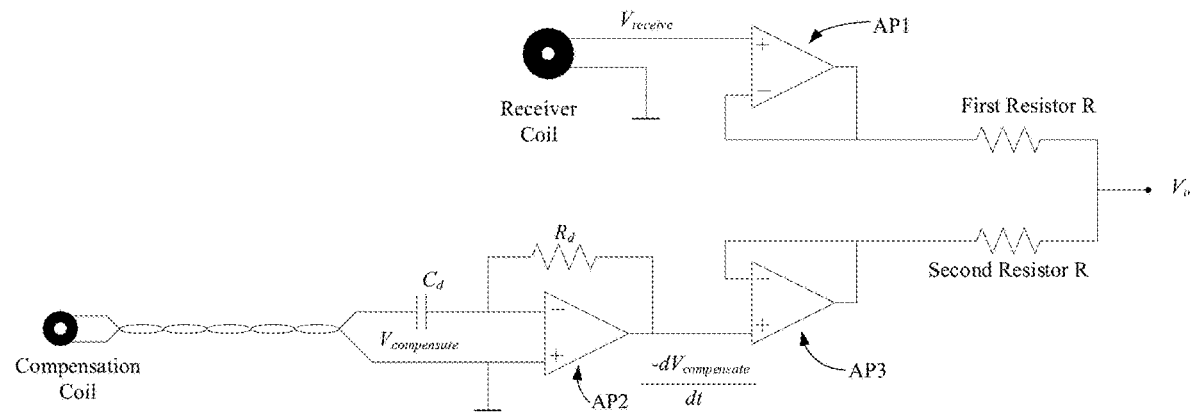

FIG. 11 is a schematic diagram illustrating the addition/subtraction circuit shown in FIG. 10 further incorporating a receiver coil and a compensation coil with a shielded twisted pair connected in between according to an embodiment of the present application. As illustrated in the drawing, two leads of the compensation coil are respectively connected to the two wires of the shielded twisted pair at one end. At the other end of the shielded twisted pair, one wire of the shielded twisted pair is connected to the capacitor Cd, and the other wire of the shielded twisted pair is connected to the non-inverting terminal of the amplifier AP2. Regarding the receiver coil having two leads, one lead is grounded, the other lead is connected to the non-inverting terminal of the first amplifier AP1 to output the signal V receive to the first amplifier AP1. The other connections between the various components of the addition/subtraction circuit are identical with those depicted in the addition/subtraction circuit shown in FIG. 10, and so are not to be detailed herein again.

By using the foregoing structure, an induction signal after compensation is as follows:

$$v_t = v_r - v_c = v_1 + v_2 - v_1 = v_2 \tag{3}$$

Where $v_t$ represents a combined signal, $v_r$ represents a signal of the receiver coil, $v_c$ represents a signal of the at least one compensation coil, $v_1$ represents a signal of the primary field, and $v_2$ represents a signal of the secondary field.

The compensation of the primary field is finally fulfilled by using the foregoing compensation technology. If the respective compensation coil is evenly wound around the corresponding compensation magnetic core, the compensation coil would induce no signal of the secondary field, thereby accomplishing complete suppression of the primary field. Uneven winding of the compensation coil exerts little but insignificant impact on compensation effect.

FIG. 6 and FIG. 7 are schematic diagrams illustrating the distribution of magnetic induction strength in a radial direction $B_y$ and an axial direction $B_z$. Values of $B_z$ at the central position are basically uniform, and a value of a component $B_z$ of the transmitter coil at the central position can be obtained by using formula (1). If a transmission current is 100A, the number of turns of the transmitter coil is 3, and a radius of the transmitter coil is R=25 m, then the magnetic induction strength of the transmitter coil at the center is 7.5 μT. If the radius of the receiver coil is 1 m, then the flux linkage ψ that passes through the receiver coil is 70.7 μWb. If a cross-sectional area S of the compensation magnetic core is 1 cm², a length of a magnetic circuit 1 is 15 cm, and the receiver coil has 100 turns, then the number of turns of the compensation coil is as follows:

$$n = \frac{100\Psi l}{IS\mu_0\mu_r} = \frac{84400}{\mu_r} \quad (4)$$

When the relative magnetic permeability of the compensation magnetic core is 300, the respective compensation coil need to be wound 280 turns to meet the requirement. Actually, the magnetic permeability of the compensation magnetic core should not be too high; otherwise nonlinearity of the compensation magnetic core would be high. A magnetic material with relative magnetic permeability less than 100, very low coercivity, and very high saturation flux density is usually selected. In addition, multiple compensation coils may be connected in series to reduce the number of turns of a single compensation coil. The compensation coils can be matched by adjusting a current of a cable that passes through the compensation magnetic core(by selecting a part of a cable of the transmitter coil to pass through the magnetic core). The compensation coils each need be evenly wound to prevent the secondary field from being coupled to the compensation coils.

According to the technical disclosure of this application, a positional relationship between the receiver coil and the transmitter coil is not limited, information about the secondary field can also be normally received even if the receiver coil is disposed outside the transmitter coil or inside the transmitter coil, and the positional relationship between the transmitter coil and the receiver coil in this application constitutes no limitation.

According to the reception compensation apparatus based on the airborne transient electromagnetic method in some embodiments of this application, compensation is made for the receiver coil, so that it is more flexible to debug the reception compensation apparatus and more convenient to assemble the reception compensation apparatus, and more thorough suppression is implemented. In addition, the provided receiving compensation coils weaken neither energy injected into the earth by the primary field nor a signal of the secondary field, and exert no impact on the exploration capability. In this way, complete compensation of the primary field may be fulfilled, and therefore a cleaner signal of the secondary field can be obtained, thereby greatly improving the exploration depth and resolution.

Although the present disclosure has been described with reference to the above illustrative implementations, the person having ordinary skill in the art will readily appreciate that the foregoing illustrative implementations are merely intended to describe the present disclosure, rather than limit the scope of protection of the present disclosure. Any modifications, equivalent replacements, improvements made without departing from the spirit and principle of the present disclosure shall all fall in the scope of protection of the appended claims of the present disclosure.

What is claimed is:

1. A reception compensation apparatus based on an airborne transient electromagnetic method, comprising:
    a receiver coil;
    a transmitter coil, disposed around a periphery of the receiver coil;
    at least one compensation magnetic core, disposed around an outer surface of the transmitter coil; and
    at least one compensation coil, each of the at least one compensation coil is wound exclusively around a corresponding one of the at least one compensation magnetic core;
    an addition/subtraction circuit, the addition/subtraction circuit being connected to the compensation coil and the receiver coil, wherein the addition/subtraction circuit comprises a first amplifier, a second amplifier, a third amplifier, a first resistor, a second resistor, a third resistor, and a capacitor; wherein a signal picked up by the receiver coil is fed to a non-inverting terminal of the first amplifier, an inverting terminal of the first amplifier is directly connected to an output terminal of the first amplifier through a wire, and the output terminal of the first amplifier is connected to one end of the first resistor, and the other end of the first resistor is directly coupled to a final desired compensated signal; wherein a signal picked up by the at least one compensation coil is fed to one terminal of the capacitor, the other terminal of the capacitor is connected to an inverting terminal of the second amplifier and to one end of the third resistor, wherein a non-inverting terminal of the second amplifier is grounded, and the other end of the third resistor is connected to an output terminal of the second amplifier, which is further connected to a non-inverting terminal of the third amplifier; wherein an inverting terminal of the third amplifier is directly connected to an output terminal of the third amplifier through a wire, and the output terminal of the third amplifier is connected to one end of the second resistor, and the other end of the second resistor is directly coupled to the final desired compensated signal.

2. The reception compensation apparatus based on an airborne transient electromagnetic method of claim 1, wherein the transmitter coil and the receiver coil are concentric circles.

3. The reception compensation apparatus based on an airborne transient electromagnetic method of claim 1, wherein the at least one compensation magnetic core is a magnetic ring, and is sleeved around the outer surface of the transmitter coil.

4. The reception compensation apparatus based on an airborne transient electromagnetic method of claim 2, wherein the at least one compensation magnetic core is a magnetic ring, and the compensation magnetic core is sleeved around an outer surface of the transmitting coil.

5. The reception compensation apparatus based on an airborne transient electromagnetic method of claim 3, wherein the at least one compensation magnetic core sleeved around the outer surface of the transmitter coil, and there is no gap between the at least one compensation magnetic core and the transmitter coil.

6. The reception compensation apparatus based on an airborne transient electromagnetic method of claim 3, wherein the at least one compensation magnetic core is separated from the transmitter coil by a gap.

7. The reception compensation apparatus based on an airborne transient electromagnetic method of claim 4, wherein the at least one compensation magnetic core sleeved around the outer surface of the transmitter coil, and there is no gap between the at least one compensation magnetic core and the transmitter coil.

8. The reception compensation apparatus based on an airborne transient electromagnetic method of claim 4, wherein the at least one compensation magnetic core is separated from the transmitter coil by a gap.

9. The reception compensation apparatus based on an airborne transient electromagnetic method of claim 1, wherein the addition/subtraction circuit is connected to the compensation coil and the receiver coil, the addition/subtraction circuit is configured to process two signals respectively from the compensation coil and the receiver coil, and neutralize the two signals.

10. The reception compensation apparatus based on an airborne transient electromagnetic method of claim 2, wherein the addition/subtraction circuit is connected to the compensation coil and the receiver coil, the addition/subtraction circuit is configured to process two signals respectively from the compensation coil and the receiver coil, and neutralize the two signals.

11. The reception compensation apparatus based on an airborne transient electromagnetic method of claim 1, further comprising a shielded twisted pair that is disposed between the transmitter coil and the at least one compensation coil and that connects the receiver coil to the at least one compensation coil.

12. The reception compensation apparatus based on an airborne transient electromagnetic method of claim 2, further comprising a shielded twisted pair that is disposed between the transmitter coil and the compensation coil and that connects the transmitter coil to the at least one compensation coil.

13. The reception compensation apparatus based on an airborne transient electromagnetic method of claim 1, wherein each compensation coil comprises a plurality of windings that are evenly wound around a respective one of the at least one compensation magnetic core.

14. The reception compensation apparatus based on an airborne transient electromagnetic method of claim 2, wherein each compensation coil comprises a plurality of windings that are evenly wound around a respective one of the at least one compensation magnetic core.

15. The reception compensation apparatus based on an airborne transient electromagnetic method of claim 1, wherein the at least one compensation magnetic core comprises a plurality of compensation magnetic cores, and accordingly the at least one compensation coil comprises a plurality of compensation coils that are connected to each other in series by a wire, wherein the plurality of compensation coils are evenly wound in a same direction.

16. The reception compensation apparatus based on an airborne transient electromagnetic method of claim 2, wherein the at least one compensation magnetic core comprises a plurality of compensation magnetic cores, and accordingly the at least one compensation coil comprises a plurality of compensation coils that are connected to each other in series by a wire, wherein the plurality of compensation coils are evenly wound in a same direction.

17. The reception compensation apparatus based on an airborne transient electromagnetic method of claim 9, further comprising a shielded twisted pair disposed between the transmitter coil and the at least one compensation coil and that connects the receiver coil to the at least one compensation coil.

\* \* \* \* \*